(12) United States Patent
Merckelbach et al.

(10) Patent No.: US 11,600,839 B2
(45) Date of Patent: Mar. 7, 2023

(54) POWER SUPPLY FOR UNDERWATER VEHICLES AND SENSORS

(71) Applicant: Helmholtz-Zentrum Geesthacht Zentrum für Material- und Küstenforschung GmbH, Geesthacht (DE)

(72) Inventors: Lucas Merckelbach, Geesthacht (DE); Prokopios Georgopanos, Geesthacht (DE); Torsten Brinkmann, Geesthacht (DE); Burkard Baschek, Aumühle (DE)

(73) Assignee: Helmholtz-Zentrum hereon GmbH

( * ) Notice: Subject to any disclaimer, the term of this patent is extended or adjusted under 35 U.S.C. 154(b) by 299 days.

(21) Appl. No.: 17/026,861

(22) Filed: Sep. 21, 2020

(65) Prior Publication Data
US 2021/0143464 A1 May 13, 2021

(30) Foreign Application Priority Data
Nov. 8, 2019 (EP) .................................. 19208033

(51) Int. Cl.
*H01M 8/22* (2006.01)
*B60L 50/70* (2019.01)
(Continued)

(52) U.S. Cl.
CPC ............... *H01M 8/22* (2013.01); *B60L 50/70* (2019.02); *B63G 8/001* (2013.01);
(Continued)

(58) Field of Classification Search
CPC .... H01M 8/00; H01M 8/0239; H01M 8/0606; H01M 8/22; H01M 2250/20; B60L 50/70;
(Continued)

(56) References Cited

U.S. PATENT DOCUMENTS

| 5,595,658 A | 1/1997 | Fritsch et al. |
| 7,938,077 B1 * | 5/2011 | Dunn ...................... B63G 8/08 114/337 |

(Continued)

FOREIGN PATENT DOCUMENTS

| EP | 0637990 A1 | 2/1995 |
| EP | 3276727 A1 | 1/2018 |

OTHER PUBLICATIONS

Bellingham, "Platforms: Autonomous Underwater Vehicles", Encyclopedia of Ocean Sciences, pp. 473-484, 2nd ed. 2009.
(Continued)

*Primary Examiner* — Lars A Olson
(74) *Attorney, Agent, or Firm* — Nields, Lemack & Frame, LLC

(57) ABSTRACT

The present invention relates to a power supply system for underwater vehicles, in particular to a power supply system for autonomous underwater vehicles, to underwater vehicles equipped with such power supply systems and to a method of operating an underwater vehicle. The power supply system for underwater vehicles comprises a hydrogen fuel cell, which on the one hand is in fluid contact with a metal hydride storage tank, and on the other hand, with a membrane module that is capable of extracting dissolved oxygen from water. By combining the above mentioned components, the energy necessary to support the AUV operation and the operation of its sensors can be provided, replacing in an efficient and sustainable way the currently employed battery energy systems. For the operation of gliders, a weight compensating mechanism could also be implemented.

16 Claims, 2 Drawing Sheets

Figure 1:
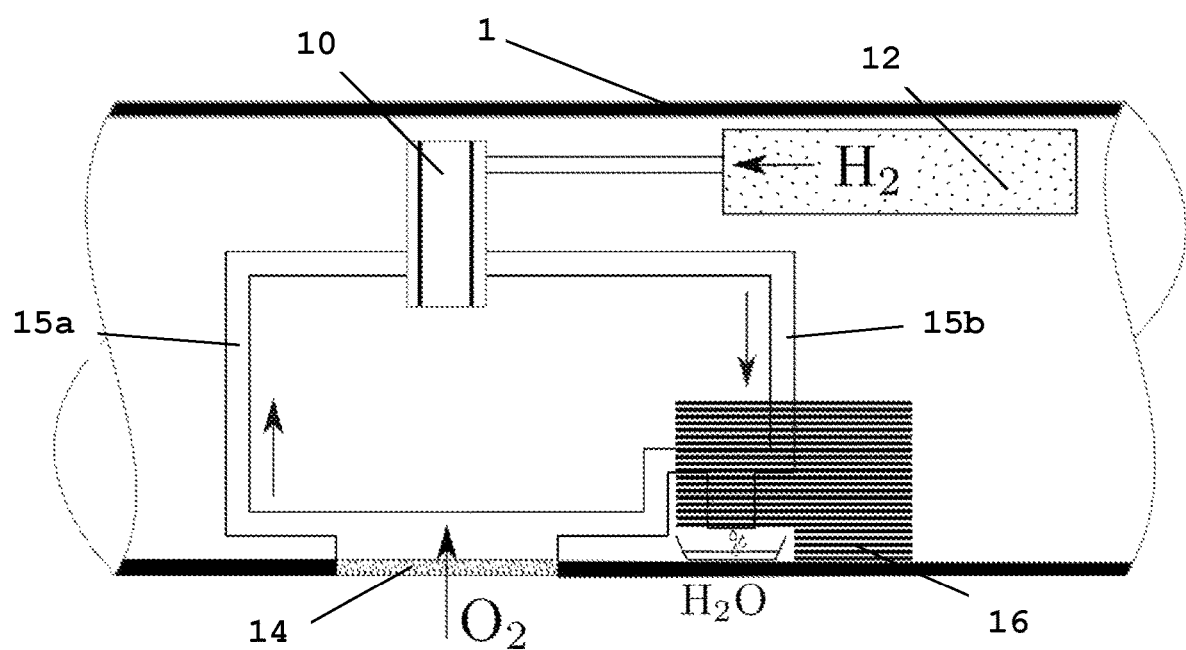

(51) Int. Cl.
*B63G 8/00* (2006.01)
*H01M 8/02* (2016.01)
*H01M 8/06* (2016.01)
*H01M 8/0239* (2016.01)
*H01M 8/0606* (2016.01)

(52) U.S. Cl.
CPC ....... *H01M 8/0239* (2013.01); *H01M 8/0606* (2013.01); *B60L 2200/32* (2013.01); *B63G 2008/004* (2013.01); *H01M 2250/20* (2013.01)

(58) Field of Classification Search
CPC ....... B60L 2200/32; B63G 8/00; B63G 8/001; B63G 2008/004
USPC .......................................................... 114/312
See application file for complete search history.

(56) References Cited

U.S. PATENT DOCUMENTS

| | | | |
|---|---|---|---|
| 8,673,067 B2 * | 3/2014 | Liu | H01M 8/0662 96/5 |
| 10,543,893 B2 * | 1/2020 | Reeh | B63G 8/08 |
| 2003/0164135 A1 | 9/2003 | King | |
| 2010/0064958 A1 | 3/2010 | Cameron et al. | |
| 2010/0297531 A1 | 11/2010 | Liu et al. | |
| 2018/0162504 A1 | 6/2018 | Lindsø | |

OTHER PUBLICATIONS

Bradley et al., "Power Systems for Autonomous Underwater Vehicles", IEEE Journal of Oceanic Engineering, vol. 26, pp. 526-538, 2001.

Capurso et al., "Development of a Modular Room-Temperature Hydride Storage System for Vehicular Applications", Applied Physics A, vol. 122, pp. 1-11, 2016.

Heo et al., "Separation of Dissolved Gases from Water for a Portable Underwater Breathing", International Scholarly and Scientific Research & Innovation, vol. 7, No. 7, pp. 1542-1545, 2013.

Heo et al., "Separation Characteristics of Dissolved Gases from Water Using a Polypropylene Hollow Fiber Membrane Module with High Surface Area", International Scholarly and Scientific Research & Innovation, vol. 8, No. 7, pp. 1295-1298, 2014.

Humphris, "Vehicles for Deep Sea Exploration", Encyclopedia of Ocean Sciences, 2nd Ed. pp. 255-266, 2009.

European communication dated May 6, 2020 in corresponding European patent application No. 19208033.1.

* cited by examiner

POWER SUPPLY FOR UNDERWATER VEHICLES AND SENSORS

FIELD OF THE INVENTION

The present invention relates to a power supply system for underwater vehicles and their sensors, in particular to (i) a power supply system for autonomous underwater vehicles and their sensors, (ii) underwater vehicles equipped with such power supply systems and (iii) a method of operating an underwater vehicle.

BACKGROUND OF THE INVENTION

An autonomous underwater vehicle, or AUV, is a self-propelled, unmanned, untethered underwater vehicle capable of carrying out simple activities with little or no human supervision. AUVs are often used as survey platforms to map the seafloor or measure physical, chemical, or biological properties of the water. A large variety of AUVs is in existence, ranging from vehicles weighing tens of kilograms, to vehicles weighing thousands of kilograms. See J. G. Bellingham, "*Platforms: Autonomous Underwater Vehicles*" in Encyclopedia of Ocean Sciences, $2^{nd}$ Ed. 2009, pages 473-484.

AUV technology is in a phase of rapid growth and expanding diversity. There are now more than 50 companies or institutions around the world operating AUVs for a variety of purposes. For example, the offshore gas and oil industry uses them for geologic hazards surveys and pipeline inspections. AUVs are, furthermore, being used for deep-sea exploration. These unmanned, untethered vehicles are pre-programmed and deployed to drift, drive, or glide through the ocean without real-time intervention from human operators. All power is supplied by energy systems carried within the AUV. They can run missions of many hours or days on their internal energy systems. See S. E. Humphries, "*Vehicles for Deep Sea Exploration*" in Encyclopedia of Ocean Sciences, $2^{nd}$ Ed. 2009, pages 255-266.

Autonomous underwater vehicles are predestined for research in the water column to better understand the circulation of the ocean and its influence on climate. While satellites provide global coverage of conditions at the sea surface, AUVs are likely to be the only way to access data from the ocean depths continuously. Equipped with oceanographic sensors that measure temperature, salinity, current speed, and phytoplankton abundance, AUVs profile the water column by sinking to a pre-programmed depth, and then rising to the surface where they transmit their data via satellite back to a data server on shore.

Gliders have become the AUVs with the highest endurance and longest operational range. They are able to sample the ocean interior at comparatively low costs because they can operate independently of ships for the better part of a year under global remote control, reporting the observations they collect in near real-time. They are well suited to intensive, regular, and sustained observations of oceanic properties that are readily measured by electronic means.

AUVs and their sensors are almost always battery powered, see A. M. Bradley et al. "Power Systems for Autonomous Underwater Vehicles" in IEEE Journal of Oceanic Engineering, Vol. 26, 2001, pages 526-538. The highest energy density is achieved with lithium primary batteries, which are non-rechargeable, not environmentally friendly, and operationally expensive. Nevertheless they have so far been used because they are efficient and reliable. As an alternative to lithium primary batteries, rechargeable battery systems remove some of the adverse aspects, but their energy density is significantly lower. Furthermore, there are increasing safety concerns regarding lithium batteries, and legal transportation restrictions apply if they are not prepared in accordance with transport regulations, such as IATA transport regulations.

Fuel cells have so far not been extensively used in AUVs because of weight and volume disadvantages caused by the storage of oxygen and hydrogen. The use of fuel cells—once the above problems are solved—as a power supply system for underwater vehicles, especially autonomous underwater vehicles such as gliders, promises to be an environmentally friendly and sustainable substitute for battery-powered systems. There are practically no legal transportation restrictions with regard to fuel cells.

SUMMARY OF THE INVENTION

In one aspect, the present invention provides a power supply system for underwater vehicles. The system comprises a hydrogen fuel cell which is on the one hand in contact with a metal hydride storage tank and on the other hand with a membrane module, the membrane module being capable of harvesting the dissolved oxygen from water.

The system according to the invention combines a fuel cell, preferably a proton exchange membrane (PEM) fuel cell, an efficient storage system for hydrogen using metal hydrides, a membrane module employing an oxygen selective membrane for harvesting oxygen from the aqueous environment. By combining the components mentioned above, the energy necessary to support the AUV operation and the operation of its sensors can be provided, replacing in an efficient and sustainable way the currently employed battery energy systems.

DETAILED DESCRIPTION OF THE INVENTION

A. Fuel Cell

In an embodiment of the invention, the hydrogen fuel cell is a proton-exchange membrane (PEM) fuel cell. PEM fuel cells have high power density, rapid startup, and low-temperature operation of about 60° C. to 120° C. The electrolyte used is a proton-conducting polymer, typically a perfluorinated polymer (e.g., a tetrafluoroethylene-perfluoro-3,6-dioxa-4-methyl-7-octenesulfonic acid copolymer, available under the trade name Nafion®). Preferred PEM fuel cells are Low-Temperature PEM fuel cells (LT-PEM) operating at a temperature of about 60° C. to 80° C.

PEM fuel cells are commercially available in a number of designs ranging from 10 W to 10 kW stack modules. In an embodiment of the invention, PEM fuel cells having a rated power capacity ranging from 10 W to 30 W would be sufficient for the operation of gliders. For other applications, higher power fuel cells having a rated power capacity ranging from more than 10 W up to 10 kW or higher could also be employed.

PEM fuel cells comprise a proton-conducting membrane as the electrolyte contained between two porous electrodes. Within the cell, $H_2$ at the anode provides protons and releases electrons, which pass through the external circuit to reach the cathode. The protons solvate with water molecules and diffuse through the membrane to the cathode to react with the $O_2$ while picking up electrons to form water.

For cost and handling reasons, Low-Temperature PEM fuel cells (LTPEM), operating at temperatures between 60°

C. and 120° C., preferably between 60° C. and 80° C., are preferably used in accordance with the present invention.

B. Hydrogen Storage System—Metal Hydride

Storing hydrogen in the solid-state hydride form holds a volumetric advantage over the compressed and liquid hydrogen states. Solid hydrogen storage systems also have features of low-pressure operation, compactness, safety, tailorable delivery pressure, excellent absorption/desorption kinetics, modular design for easy scalability. Typical examples of commercially available solid hydrogen storage systems includes portable canisters, lightweight fibre wrapped vessels (both developed by Texaco Ovonic Hydrogen Systems LLC), metal hydride canisters developed by Heliocentric.

Metal hydride (MH) materials are able to reversibly absorb and desorb large amounts of hydrogen in a wide range of temperatures and pressures. Metal hydrides having a high hydrogen-storage density are known. Metal hydrides could reach a volumetric hydrogen density of 115 kg m$^{-3}$, e.g., LaNi$_5$. The highest volumetric hydrogen density reported is 150 kg m$^{-3}$ in Mg$_2$FeH$_6$ and Al(BH$_4$)$_3$.

Metal hydrides, which can be charged and discharged reversibly, are mostly metallic alloys. Their composition determines the temperature and pressure levels for hydrogen desorption and adsorption. Some metal hydrides desorb hydrogen at ambient temperature and close to atmospheric pressure, which is a preferred factor for the portable application according to the present invention. In accordance with a preferred embodiment of the present invention, the metal hydrides are selected from those having a desorption temperature of from 20° C. to 100° C., more preferably from 25° C. to 60° C. at 500 kPa. In a further preferred embodiment, the heat of operation of the fuel cell is at least partially transferred to the metal hydride tank so that the desorption temperature can be reached in an economic manner. The heat transfer may be accomplished via a heat exchanger.

A type of preferred metal hydride storage materials is selected from an alloy of the Hydralloy® C. family. Such metal hydrides are commercially available from GfE GmbH in Germany. Hydralloy® C. family alloys are those which consist of 45-55 wt. % Mn, 25-35 wt. % Ti and Zr, 15-20 wt. % V and Fe, and optionally a small amount of Cr and/or Ni may be included as well. As an example, a hydrogen storage tank based on Hydralloy® C5 (Ti$_{0.95}$Zr$_{0.05}$Mn$_{1.46}$V$_{0.45}$Fe$_{0.09}$)) to be integrated with a Low Temperature-PEM (LT-PEM) could be realized in accordance with the present invention. The Hydralloy® C5 metal hydride has a maximum gravimetric density of about 1.7-1.8 wt. % H$_2$. An example of such system is described in G. Capurso, et al., Appl. Phys. A, 2016 (122) 236 pages 1-11.

It is possible to use other metal hydrides as well to obtain a higher storage capacity for hydrogen; nevertheless, the application will then have to be optimized for higher operational temperatures. Those other metal hydrides include alloys of the formula LaNi$_{4.8}$Al$_{0.2}$, ZrMn$_{2-x}$Ni$_x$, wherein x=1.25 to 1.50, e.g., ZrMn$_{0.50}$Ni$_{1.50}$, ZrMn$_{0.60}$Ni$_{1.40}$, ZrMn$_{0.75}$Ni$_{1.25}$, ZrMn$_{0.60}$Ni$_{1.40}$; hydrides of pseudobinary AB$_5$ and AB$_2$ alloys including for example Ti$_{25}$Cr$_{50}$V$_{20}$Mo$_5$, TiCr$_{1.9}$Mo$_{0.1}$, ZrFe$_{1.8}$V$_{0.2}$, ZrFe$_{1.8}$Mn$_{0.2}$, Zr$_{0.2}$Ti$_{0.8}$Fe$_{1.6}$V$_{0.4}$, ZrFe$_{1.85}$V$_{0.20}$, Ti$_{0.32}$Cr$_{0.43}$V$_{0.25}$, (Ti$_{0.85}$Zr$_{0.15}$)$_{1.1}$Cr$_{0.9}$Mo$_{0.1}$Mn, (Ti$_{0.85}$Zr$_{0.15}$)$_{1.1}$Cr$_{0.925}$MnFe$_{0.075}$ and Ti$_{1.02}$Cr$_{1.1}$Mn$_{0.3}$Fe; as well as other room temperature alloys such as Ti$_{0.5}$V$_{0.5}$Mn, Ti$_{1.1}$CrMn, Ti$_{35}$Cr$_{34}$Mn$_{31}$.

C. Membrane for Oxygen Extraction from Water

Water contains small amounts of dissolved oxygen gas (O$_2$) and other dissolved gases such as nitrogen (N$_2$), Argon (Ar) and carbon dioxide (CO$_2$). Suitable membrane materials allow the rapid permeation of oxygen gas dissolved in water while minimizing the permeation of other gases and water when applying an oxygen pressure gradient across the membrane. Preferred membrane materials include polyolefins, such as polypropylene (PP); fluorinated polyolefins such poly(tetrafluoroethylene) (PTFE) or poly[4,5-difluoro-2,2-bis(trifluoromethyl)-1,3-dioxole-co-tetrafluoroethylene] (Teflon AF 2400); polysilicones, polysilanes and polysiloxanes such as poly(dimethylsiloxane) (PDMS) and poly (octylmethylsiloxane) (POMS). Additionally, suitable membrane materials are those polymeric membrane materials described in P. W. Heo, I. S. Park, "*Separation of Dissolved Gases from Water for a Portable Underwater Breathing*", International Scholarly and Scientific Research & Innovation 7(7) 2013, pages 1542 to 1545, and P. W. Heo, I. S. Park, "Separation Characteristics of Dissolved Gases from Water Using a Polypropylene Hollow Fiber Membrane Module with High Surface Area", International Scholarly and Scientific Research & Innovation 8(7) 2014, 1295 to 1298, which are fully incorporated for reference herein. The membrane material is preferably hydrophobic to repel water.

In a preferred embodiment of the invention, the membrane is assembled in a way so as to form a thin film composite membrane, which consists of different layers of polymer materials. Such thin film composite membrane are described in EP 0 637 990 B1, the disclosure of which is incorporated herein by reference. For example, the membrane may comprise at least one porous support layer and an oxygen gas selective layer. According to a more specific example, the membrane may comprise a polyester non-woven porous support layer, having an adjacent layer of polyacrylonitrile (PAN) and, adjacent to the PAN layer, a selective top layer of the afore-mentioned polymeric membrane materials. In another embodiment of the invention, the polymer of the selective top layer is a polymer, which has been cross-linked, preferably via, e.g., a thermal and/or radiation catalytic process. Such cross-linking provides enhanced stability to the membrane.

A plurality of membranes is preferably arranged in a membrane module in a way that provides water flow for reduction as much as possible of the formation of boundary layer zones.

In another embodiment of the present invention, the membrane module consists of membranes in flat sheet geometry. The membranes are preferably arranged in such a way that the optimum flow of water is achieved, so that the boundary layer effect is reduced to allow for oxygen to permeate from water to the permeate side of the membrane. Alternatively, the membrane module consists of membranes in hollow fibre geometry, for increased membrane surface area.

As described in the previous embodiment, the membrane module is in direct contact with the fuel cell. The circulation of the oxygen-containing gas on the side of the oxygen of the fuel cell is preferably conducted in a closed loop system, which creates sufficient concentration difference (difference of the chemical potential) between the feed and permeate side. The accumulation of the other co-permeating gases in the loop may be avoided by the equilibration of the concentration on the feed and permeate side. Together with the extraction of the gases, water may also co-permeate through the membrane leading to an increase of the water concentration of the permeate side.

Specifically to the point of the water in the closed loop of gas stream of the fuel cell, the permeated water as well as the water vapour produced by the fuel cell may be directly purged into the environment. For this purpose, a heat exchanger may be provided that will condense the water vapour. A pumping system connected to the heat exchanger may be provided as well to release the condensed water into the environment. However, to control the weight balance, part of the water produced by the fuel cell may be introduced into a weight compensating mechanism, which controls the buoyancy of the underwater vehicle. This may be advantageous for AUVs of the type of gliders.

Depending on the power requirement, preferred membrane surfaces may range from 1 m$^2$ to 10 m$^2$, preferably from 2 m$^2$ to 5 m$^2$. Some examples for a preferred membrane thickness range from 10 μm to 500 μm, more preferably from 20 μm to 200 μm.

The membrane module may be placed on any part of the underwater vehicle, as long as it comes in contact with water and a flow of water in the membrane module is possible. Preferred locations are the nose of the underwater vehicle, the top and bottom, and the hydrofoils, if present. Mostly preferred locations in view of incident water flow are nose and hydrofoils of the underwater vehicle.

The membrane module is in contact with the fuel cell in a manner that oxygen can flow from the membrane module to the fuel cell.

Figure 2:
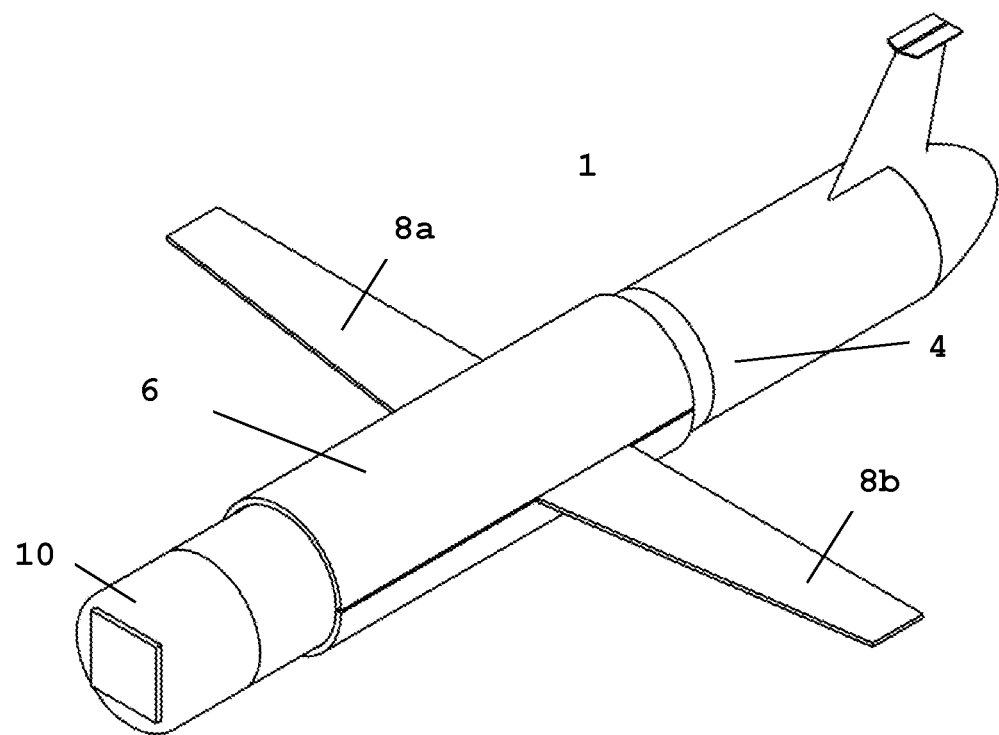

The invention is now described in an exemplary manner with reference to the appended figures, wherein FIG. 1 is a schematic representation of the invention; and FIG. 2 is an illustration of an AUV having installed a membrane module at its nose, and exhibiting a surrounding shell and two hydrofoils which can also act as potential membranes housings.

FIG. 1 is a schematic representation of the invention. It shows a fuel cell 10 located within the body, nose part or another location in an underwater vehicle 1. The fuel cell 10 is in flow connection with a metal hydride tank 12, which delivers hydrogen (H$_2$) to operate the fuel cell 10. The fuel cell 10 is also in flow connection with a membrane module 14, wherein a plurality of membranes is arranged in a way that provides water flow for reduction as much as possible of the formation of boundary layer zones.

The membranes in the membrane module 14 extract dissolved oxygen (O$_2$) from water as a permeate stream. A permeate stream from the membrane module 14 is present in the form of an O$_2$ rich gas, which may contain minor amounts of other gases such as nitrogen (N$_2$), argon (Ar), carbon dioxide (CO$_2$) and/or water vapour. The permeate stream is guided in a loop system 15a from the membrane module 14 to the fuel cell 10 and the O$_2$ in the permeate stream is consumed therein. O$_2$ depleted gas may be recirculated in the loop system 15b from the fuel cell 10 to the membrane module 14 to maintain a gas flow between the membrane module and the fuel cell.

As H$_2$ and O$_2$ are consumed in the fuel cell, water (H$_2$O) is produced. The H$_2$O produced in the fuel cell—and also H$_2$O which has co-permeated through the membrane as water vapour—may be released to the environment. For this purpose, a heat exchanger 16 may be provided that will condense the water and a pumping system connected to the heat exchanger 16 will release the condensed water into the environment. Part of the H$_2$O produced may, however, be used for buoyancy control in the underwater vehicle. The fuel cell 10 produces the energy necessary to operate the underwater vehicle 1 and the sensors therein.

FIG. 2 illustrates an underwater vehicle 1 having a body part 4 which is surrounded by a shell 6 and which is fitted with hydrofoils 8a, 8b. Such hydrofoils 8a, 8b are typical for gliders that allow the gliders to glide forward while descending or ascending through the water. The nose of the underwater vehicle is equipped with a membrane module 10 comprising an array of membranes. In FIG. 2, the membrane module 10 incorporates an array of membranes 10, and is attached to the nose of the underwater vehicle 1. The membranes are arranged within the membrane module 10 so as to allow for contact of the membranes with ambient water. The membranes allow oxygen gas (O$_2$) to permeate from the water flow into the gas stream and the oxygen rich permeate stream will be conveyed to a fuel cell with which the membrane module is in contact. The surrounding shell 6 and the hydrofoils 8a, 8b can also be considered as potential housings for the membranes.

As shown in FIG. 2, the membrane module may be placed on the nose of an underwater vehicle. However, other locations such the top and bottom, and the hydrofoils, of the underwater vehicle may be suitable locations as well.

In FIG. 2, the body part 4 of the underwater vehicle 1 hosts the fuel cell and the metal hydride tank (both not shown), as well as the sensor equipment and buoyancy control equipment (also not shown).

EXAMPLE

An ocean glider, a low power AUV, requires about 3-5 W and operates typically for about 5 weeks. Using a 10 W commercially available fuel cell, this means that it is necessary to use 50 mol of oxygen and 100 mol of hydrogen. For the efficient storage and transport of hydrogen, ca. 12 kg of commercial hydride, e.g., Hydralloy® C. are necessary. A simple mass transfer model indicates that for the extraction of 50 mol of oxygen from water, 2-5 m$^2$ of polymer membrane based, e.g., on the polymer poly(octylmethylsiloxane) (POMS) is sufficient. During the 5 weeks operation 1.8 kg water is produced, of which 1.6 kg is to be purged from the vehicle to maintain its weight while the glider reaches the surface of the water and the pressure will be equilibrated.

The invention claimed is:

1. An underwater vehicle equipped with a power supply system, the power supply system comprising a hydrogen fuel cell, a metal hydride storage tank and a membrane module, wherein the hydrogen fuel cell is in fluid contact with said metal hydride storage tank and with said membrane module, the membrane module employing an oxygen selective membrane in the form of a thin film composite membrane, capable of harvesting dissolved oxygen from an aqueous environment.

2. The underwater vehicle of claim 1, wherein the hydrogen fuel cell is a proton-exchange membrane (PEM) fuel cell.

3. The underwater vehicle of claim 1, wherein the fuel cell is a fuel cell operating at a temperature between 60° C. and 120° C.

4. The underwater vehicle of claim 3, wherein the fuel cell is a fuel cell operating at a temperature between 60° C. and 80° C.

5. The underwater vehicle of claim 1, wherein the membrane module comprises a membrane of a material selected from the group consisting of polyolefins; polysilicones; polysilanes, polysiloxanes, and fluorinated polyolefins.

6. The underwater vehicle of claim 5, wherein the membrane material is selected from cross-linked poly(dimethylsiloxane) (PDMS) and poly(octylmethylsiloxane) (POMS).

7. The underwater vehicle of claim 1, wherein the membrane is of a flat sheet geometry or a hollow geometry.

8. The underwater vehicle of claim 1, wherein the metal hydride is selected from those having a desorption temperature of from 20° C. to 100° C. at 500 kPa.

9. The underwater vehicle of claim 1, wherein the heat of operation of the fuel cell is at least partially transferred to the metal hydride tank.

10. The underwater vehicle of claim 1, which is an autonomous underwater vehicle (AUV).

11. The underwater vehicle of claim 10, which is an autonomous underwater vehicle (AUV) of the type of a glider.

12. The underwater vehicle of claim 1, wherein the underwater vehicle has a vehicle shell, a nose, a shoulder, a top, a bottom and hydrofoils, and wherein the membrane module is positioned at the nose of the underwater vehicle, the shoulder, the top or bottom of the underwater vehicle shell, or the hydrofoils of the underwater vehicle.

13. The underwater vehicle of 12, wherein the membrane module is positioned at the nose of the underwater vehicle.

14. A method of operating an underwater vehicle, wherein power is supplied by a power supply system comprising a hydrogen fuel cell, metal hydride storage tank and a membrane module, wherein the hydrogen fuel cell is in fluid contact with said metal hydride storage tank and with said membrane module, the membrane module employing an oxygen selective membrane capable of harvesting dissolved oxygen from an aqueous environment.

15. The underwater vehicle of claim 5, wherein the polysiloxanes are poly(dimethylsiloxane) (PDMS) or poly(octylmethylsiloxane) (POMS).

16. The underwater vehicle of claim 5, wherein the fluorinated polyolefins are poly(tetrafluoroethylene) (PTFE) or poly[4,5-difluoro-2,2-bis(trifluoromethyl)-1,3-dioxole-co-tetrafluoroethylene] (Teflon AF 2400).

* * * * *